United States Patent
Gourlay et al.

(10) Patent No.: US 8,705,381 B2
(45) Date of Patent: Apr. 22, 2014

(54) COMMUNICATION EMBODIMENTS AND LOW LATENCY PATH SELECTION IN A MULTI-TOPOLOGY NETWORK

(75) Inventors: Douglas A. Gourlay, Sausalito, CA (US); Leonard N. Thompson, Sugar Hill, GA (US); Omar G. Abuabara, Irving, TX (US); Anthony R. Faustini, Red Bank, NJ (US)

(73) Assignee: Cisco Technology, Inc.

( * ) Notice: Subject to any disclaimer, the term of this patent is extended or adjusted under 35 U.S.C. 154(b) by 1387 days.

(21) Appl. No.: 11/810,400

(22) Filed: Jun. 5, 2007

(65) Prior Publication Data

US 2008/0304472 A1 Dec. 11, 2008

(51) Int. Cl.
*H04L 12/28* (2006.01)
*H04L 12/54* (2013.01)
*H04L 29/02* (2006.01)

(52) U.S. Cl.
USPC ............................ 370/252; 370/229; 370/400

(58) Field of Classification Search
None
See application file for complete search history.

(56) References Cited

U.S. PATENT DOCUMENTS

| | | | |
|---|---|---|---|
| 7,046,382 B1 * | 5/2006 | Chu | 358/1.15 |
| 7,327,675 B1 * | 2/2008 | Goode | 370/230 |
| 7,577,106 B1 * | 8/2009 | Shand et al. | 370/254 |
| 7,756,137 B2 * | 7/2010 | Okura et al. | 370/395.21 |
| 7,898,968 B2 * | 3/2011 | von Eicken et al. | 370/248 |
| 2002/0041590 A1 * | 4/2002 | Donovan | 370/352 |
| 2006/0046645 A1 * | 3/2006 | Ogilvie | 455/11.1 |
| 2006/0168279 A1 * | 7/2006 | Lee et al. | 709/230 |
| 2007/0232258 A1 * | 10/2007 | Matsumoto et al. | 455/404.1 |
| 2010/0309811 A1 * | 12/2010 | Tanaka et al. | 370/253 |

* cited by examiner

*Primary Examiner* — Marsha D Banks Harold
*Assistant Examiner* — Matthew Campbell
(74) *Attorney, Agent, or Firm* — Patterson & Sheridan LLP (57) ABSTRACT

In one embodiment, a source device (e.g., a VOIP phone) establishes a call connection with a remote device depending on which of multiple network paths provides an acceptable latency (e.g., a lower latency). For example, in response to receiving a request to establish a connection with a remote destination device over a network, the source device (e.g., a caller's phone) obtains multiple service code values. The source device encodes each of multiple data packets to include a unique service code value for transmission of the messages over different network topologies to a remote destination. Thus, when transmitted, each of the multiple messages follows a different logical network topology of a network as specified by a respective service code value. Based on feedback from a remote device that receives the multiple messages, the source learns a preferred logical network topology of the network for establishing the call connection.

25 Claims, 8 Drawing Sheets

COMMUNICATION EMBODIMENTS AND LOW LATENCY PATH SELECTION IN A MULTI-TOPOLOGY NETWORK

BACKGROUND

In general, IP (Internet Protocol) phones enable communications via voice signals that are encoded and transmitted as data packets over an IP network. IP phones simply put data packets onto the network. They have no control over the path the packets take on the network to a target destination such as another IP phone. IP networks are inherently stateless so IP phones typically rely on the traditional static link-cost of Djikstra values to determine a shortest path to a destination phone. Conventional methods presume that establishing a shortest path between two IP phones provides sufficient bandwidth and link quality so that respective callers can communicate with each other without annoying delays or dropped portions of a conversation.

BRIEF DESCRIPTION OF THE DRAWINGS

The foregoing and other objects, features, and advantages of the present disclosure will be apparent from the following description of preferred embodiments, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF EXAMPLE EMBODIMENTS

Overview:

In a general embodiment as discussed in more detail below, a source device (e.g., a VOIP phone) establishes a call connection with a remote device depending on which of multiple network path provides an acceptable latency (e.g., a lower latency). For example, in response to receiving a request to establish a connection with a remote destination device over a network, the source device (e.g., a caller's phone) obtains multiple service code values. The source device encodes each of multiple messages to include a unique service code value (of the obtained service code values) for transmission of the messages over different network topologies of an MTR (Multi-Topology Routing) network. The source device initiates transmission of the multiple messages over the MTR network. Each of the multiple messages follows a different logical network topology of the MTR network as specified by a respective service code value. Based on feedback from a remote device that receives the multiple messages, the source device learns a preferred logical network topology of the network for establishing a call connection from the source device to the remote destination device.

These and related embodiments will be discussed in more detail below.

DETAILED DESCRIPTION

Figure 1:
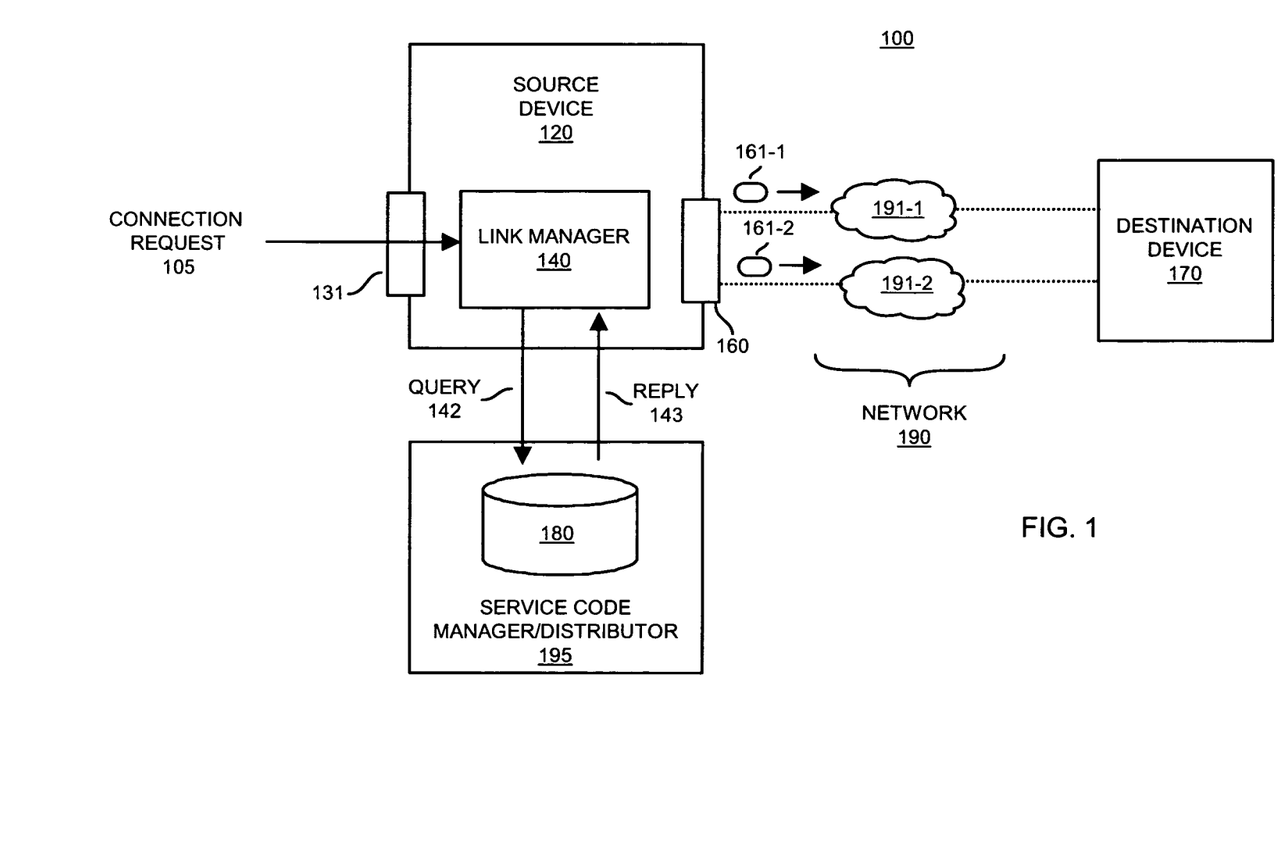
FIG. 1 is a diagram illustrating an example communication system according to embodiments herein.

FIG. 1 is an example diagram of a communication environment 100 enabling communications according to embodiments herein. As shown, communication environment 100 includes source device 120 (e.g., an IP phone operated by a user) attempting to communicate with a remote destination device 170 (e.g., an IP phone operated by another user). Source device 120 includes communication interface 131 (e.g., buttons, keypad, etc.) for receiving a call connection request 105. In one embodiment, the call connection request 105 is initiated by a respective user who types a phone number (associated with the remote destination device 170) using a keypad associated with source device 120.

Upon receiving a (call) connection request 105, the link manager 140 of source device 120 generates a query 142 for transmission to service code manager/distributor 195 to obtain multiple service codes (e.g., DSCP values). In general, and as will be discussed later in this specification, the source device 120 uses the multiple service code values to execute a PING or PONG type of test for establishing a respective communication link over network 190.

In response to receiving query 142, the service code manager/distributor 195 generates a reply 143 including multiple different service codes. The service code values enable the source device 120 to transmit messages over a different network topology 191 associated with network 190. For example, a first code provided by the service code manager/distributor 195 enables the source device 120 to classify messages for transmission over network topology 191-1, a second code provided by the service code manager/distributor 195 enables the source device 120 to classify messages for transmission over network topology 191-2, and so on.

As will be discussed, the messages 161 sent to the remote destination device 170 elicit a response from the remote destination device 170 indicating which of the messages 161 takes less time to travel to the remote destination device 170. Accordingly, the source device 120 can identify a lower latency path from the source device 120 to the remote destination device 170. The lowest latency path can be identified based on which message 161 first arrives at the remote destination device 170.

The source device 120 encodes each of different messages 161 with a respective different service code value (e.g., routing classification code) for transmission over network 190. Thereafter, the source device 120 transmits the messages over network 190 to the remote destination device 170. Communication interface 160 of source device 120 provides a port (e.g., a wired or wireless connection) to network 190 via a logical and/or physical link for transmitting the messages 161. In one embodiment, the source device 120 transmits the messages 161 at substantially the same time (e.g., one after the other or simultaneously) to the remote destination device 170. Since each of the one or more messages 161 takes different paths to remote destination device 170, the message that arrives first indicates the lower latency path from the source device 120 to the remote destination device 170.

Network 190 can include many different routers, links, queues, etc. for forwarding messages 161 (e.g., data packets). Each router element in network 190 can include different forwarding tables to route traffic depending on a respective service code value. Accordingly, message 161-1 including a first service code value is forwarded over network 190 via a first network topology 191-1; message 161-2 including a second service code value is forwarded over network 190 via a second network topology 191-2, and so on.

Functionality supported by source device 120 and, more particularly, link manager 140 will now be discussed via flowchart 200 in FIG. 2. For purposes of this discussion, the link manager 140 or other function associated with the source device 120 generally perform steps in the flowcharts. Note that the functionality associated with data communication device 120 can be extended to the other entities as well. Also, note that the steps in the below flowcharts need not always be executed in the order shown.

Figure 2:
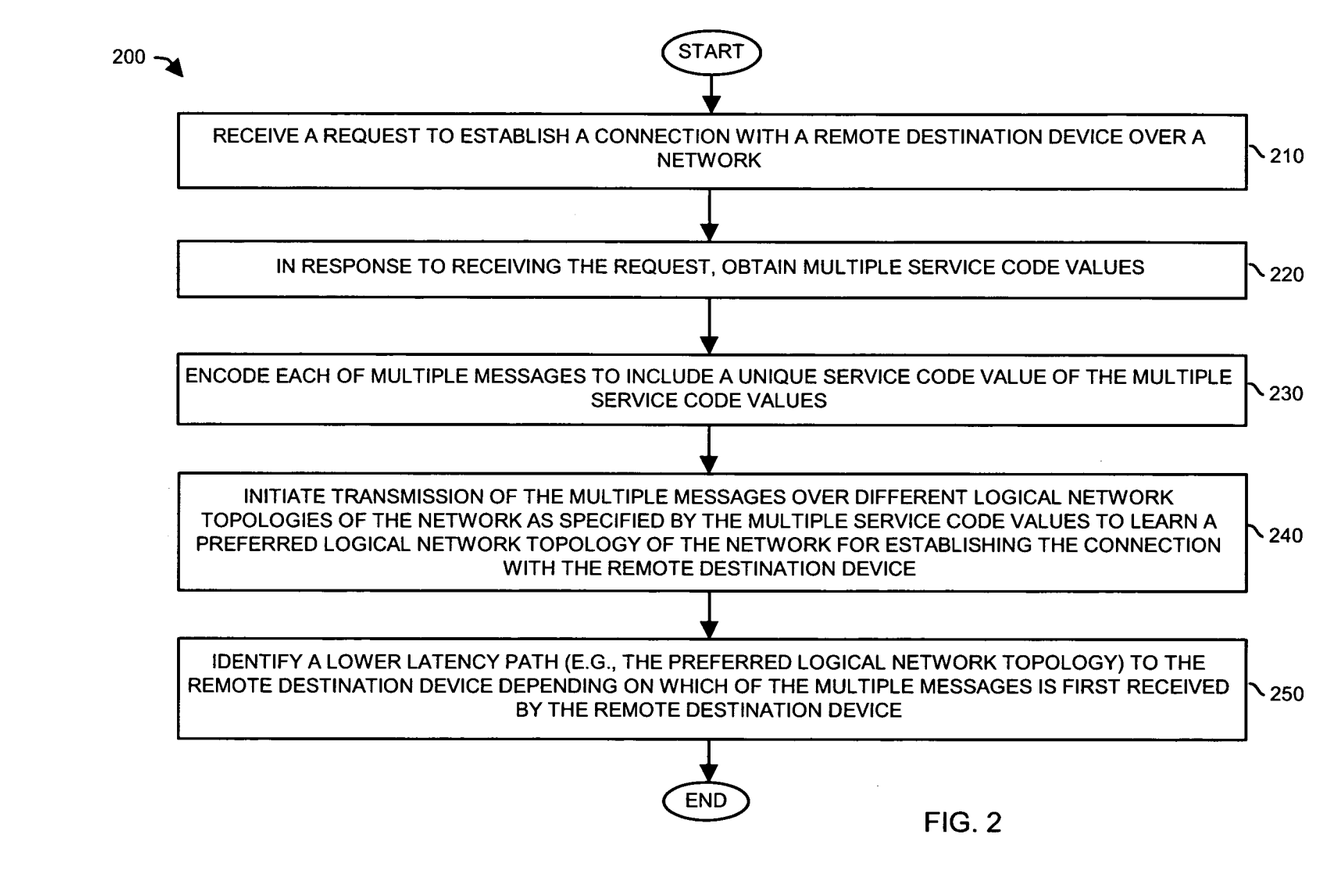
FIG. 2 is a flowchart illustrating an example method of enabling communications according to embodiments herein.

Now, more particularly, FIG. 2 is a flowchart 200 illustrating an example of a novel technique for supporting communications in communication environment 100 according to embodiments herein. Note that techniques discussed in flowchart 200 overlap and summarize some of the techniques already discussed herein.

In step 210, the link manager 140 receives a request 105 to establish a connection (e.g., a VOIP call connection) with a remote destination device 170 over a network 190 (e.g., an MTR network).

In step 220, in response to receiving the request 105, the link manager 140 obtains multiple code service values stored in repository 180. The repository 180 can reside locally or at a remote location with respect to the source device 120. For example, as will be discussed later in this specification, the repository 180 can be located in a call manager function that also provides the source device 120 with a network address associated with remote destination device 170 upon inputting a phone number of the remote destination device 170. The service code manager/distributor 195 also can be implemented at other nodes in a respective network such as a first hop network element, etc.

In step 230, the link management function 140 encodes each of multiple messages 161 to include a respective unique service code value of the service code values retrieved from repository 180. For example, the link manager 140 encodes message 161-1 to include a first service code value for transmission of message 161-1 over network topology 191-1 to the remote destination device 170. The link manager 140 encodes message 161-2 to include a second service code value for transmission of message 161-2 over network topology 191-1 to the remote destination device 170. The link manager 140 of source device 120 can repeat this process for each of any number of messages that will be transmitted over network 190 to the remote destination device 170.

In one embodiment, the service code values are DSCP (Differentiated Services Code Point) values for inclusion in data packets (e.g., messages) transmitted over network 190. Insertion of a DSCP value in an appropriate data field of a data packet classifies the respective data packet for transmission over a respective one of multiple network topologies (e.g., network topology 191-1, network topology 191-2, . . . ) supported by network 190.

In step 240, the link manager 140 initiates transmission of the multiple messages 161 over different logical network topologies 191 of the network 190 as specified by the multiple service code values to learn a preferred logical network topology of the network 190 for establishing the connection with the remote destination device 170.

In step 250, the link manager 140 identifies a lower (a better or lowest) latency path (e.g., a preferred logical network topology) to the remote destination device 170 depending on which of the multiple messages 161 is first received by the remote destination device 170. In one embodiment, as will be discussed later in this specification, the remote destination device 170 provides feedback indicating which of the multiple messages 161 is received first.

Figure 3:
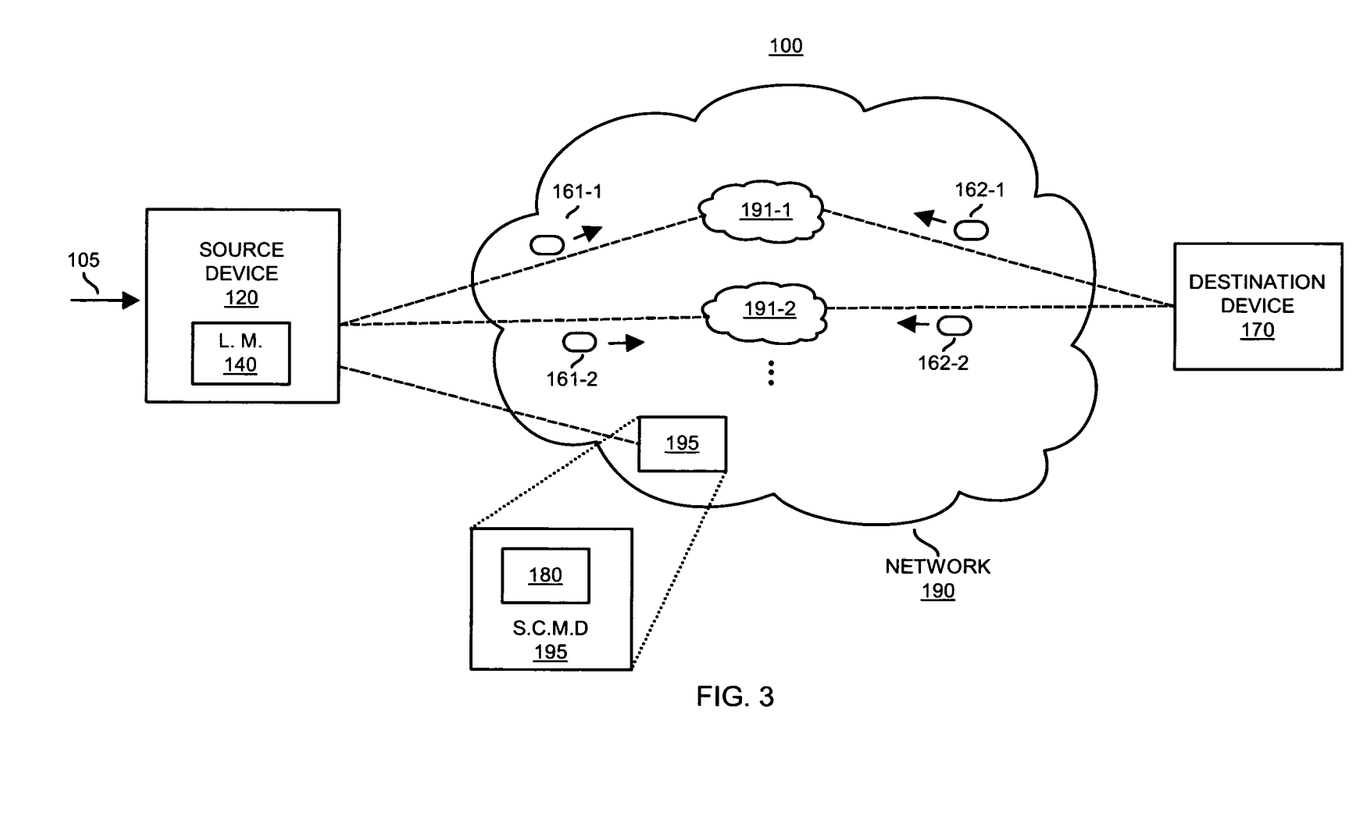
FIG. 3 is an example diagram of a communication system including IP phone devices according to embodiments herein.

FIG. 3 is an example diagram illustrating communication environment 100 according to embodiments herein. As shown, the source device 120 first accesses service code manager/distributor 195 for DSCP values stored in repository 180. Thereafter, the source device 120 encodes and transmits messages 161 on different network topologies 191 using the retrieved DSCP values. Remote destination device 170 receives both messages 161. Thereafter the remote destination device 170 initiates transmission of acknowledgment messages 162 (e.g., acknowledgment message 162-1 and acknowledgment message 162-2) back to source device 120.

In one embodiment, the remote destination device 170 sets a flag in one of the acknowledgment messages 162 to indicate which of messages 161 was received first or traveled from the source device 120 to the remote destination device 170 in less time, or which of messages 161 has a travel time below a threshold value. In a reverse direction back to the source device 120, the remote destination device 170 can use the same service code values as in the received messages 161 to encode acknowledgment messages 162 so that the acknowledgment message 162-1 for message 161-1 travels back to the source device 120 on network topology 191-1 and the acknowledgment message 162-2 for message 161-2 travels back to the source device 120 on network topology 191-2, and so on.

The remote destination device 170 can transmit the acknowledgment messages 162 at substantially the same time. Source device 120 may further provide feedback to the remote destination device 170 indicating which of the acknowledgment messages 162 is received first at the source device 120 (or has a lower associated latency) and thus which of the network topologies 191 the remote destination device 170 should establish a link with the source device for transmitting latency sensitive voice traffic.

Note that as an alternative to transmitting multiple acknowledgment messages 162 from the remote destination device 170 to the source device 120, the remote destination device 170 can transmit a single acknowledgment message back to the source device 120 to provide notification of the lowest latency path from the source device 120 to the remote destination device 170.

Based on such embodiments, the communication environment 100 can include multiple connections between the source device 120-1 and the remote destination device 170: one connection for communicating in each direction. For example, the source device 120 can communicate over a first network topology 191 to the remote destination device 170. Further, the remote destination device 170 can communicate with the source device 120 over a second (different) network topology 191 of network 190.

Each of many communication devices can be configured to perform the call setup routine as described herein in order to establish a low latency path with a corresponding target device. Note that an identified lowest latency path (or acceptable path) may not be the shortest path between the communication devices. Accordingly, embodiments herein contrast with conventional methods of establishing call connections based on the shortest identified path such as those that rely on use of a Dijkstra algorithm.

In addition to providing a novel and useful way in which to establish a connection between communication devices, embodiments herein also inherently support load-balancing of connections in network 190. For example, as a given network topology 191 becomes congested with traffic, use of the pre-connection test (as described herein to identify a network topology on which to route latency sensitive traffic) chooses the lowest latency path for establishing a new connection at a time of a respective initiation of a phone call. Thus, as the given network topology becomes congested, an alternate network topology will provide a lower latency and thus be selected for subsequent connections until it becomes more congested than other available paths, and so on.

Figure 4:
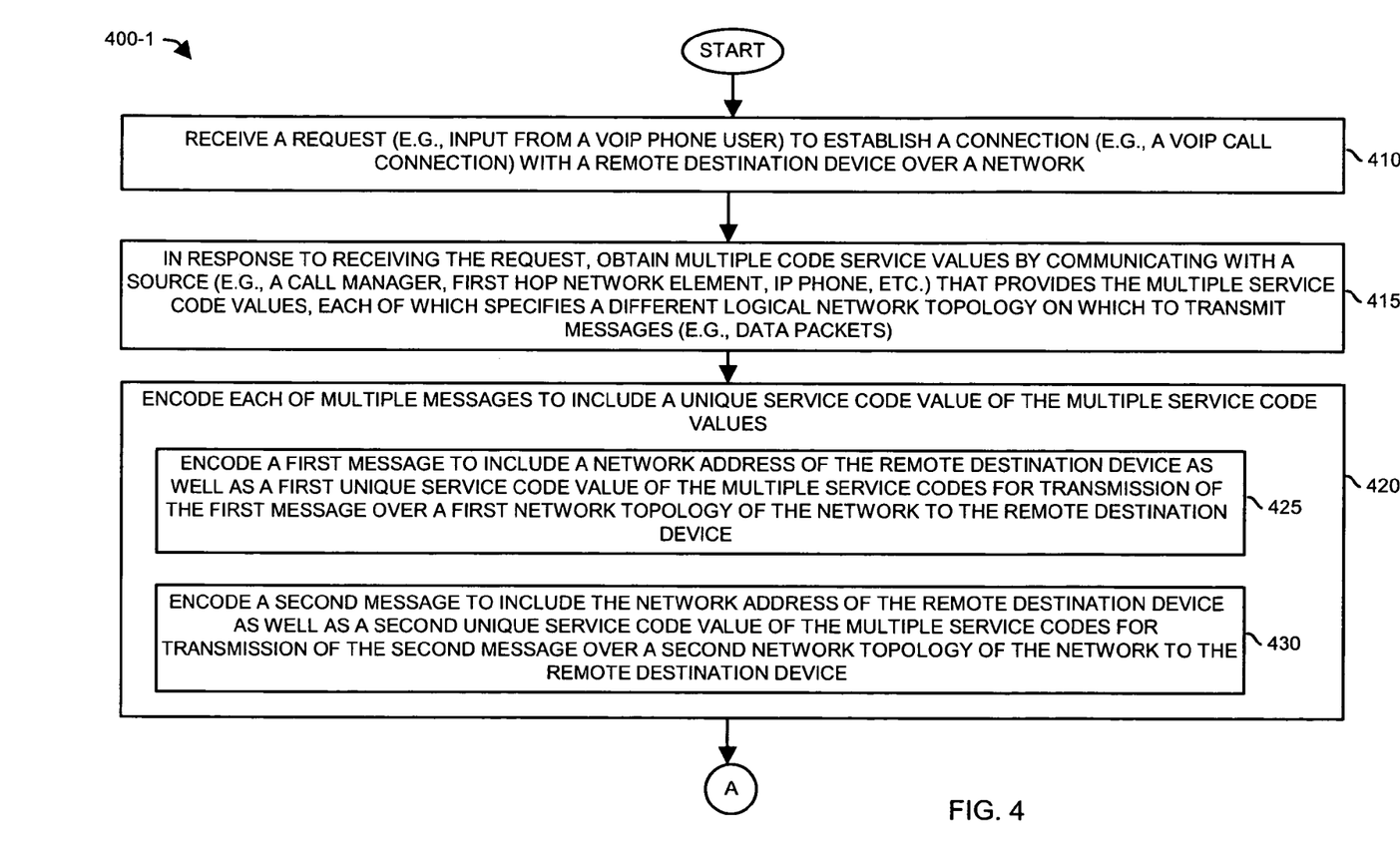
FIGS. 4, 5, and 6 combine to form an example flowchart illustrating pre-connection link testing according to embodiments herein.
Figure 5:
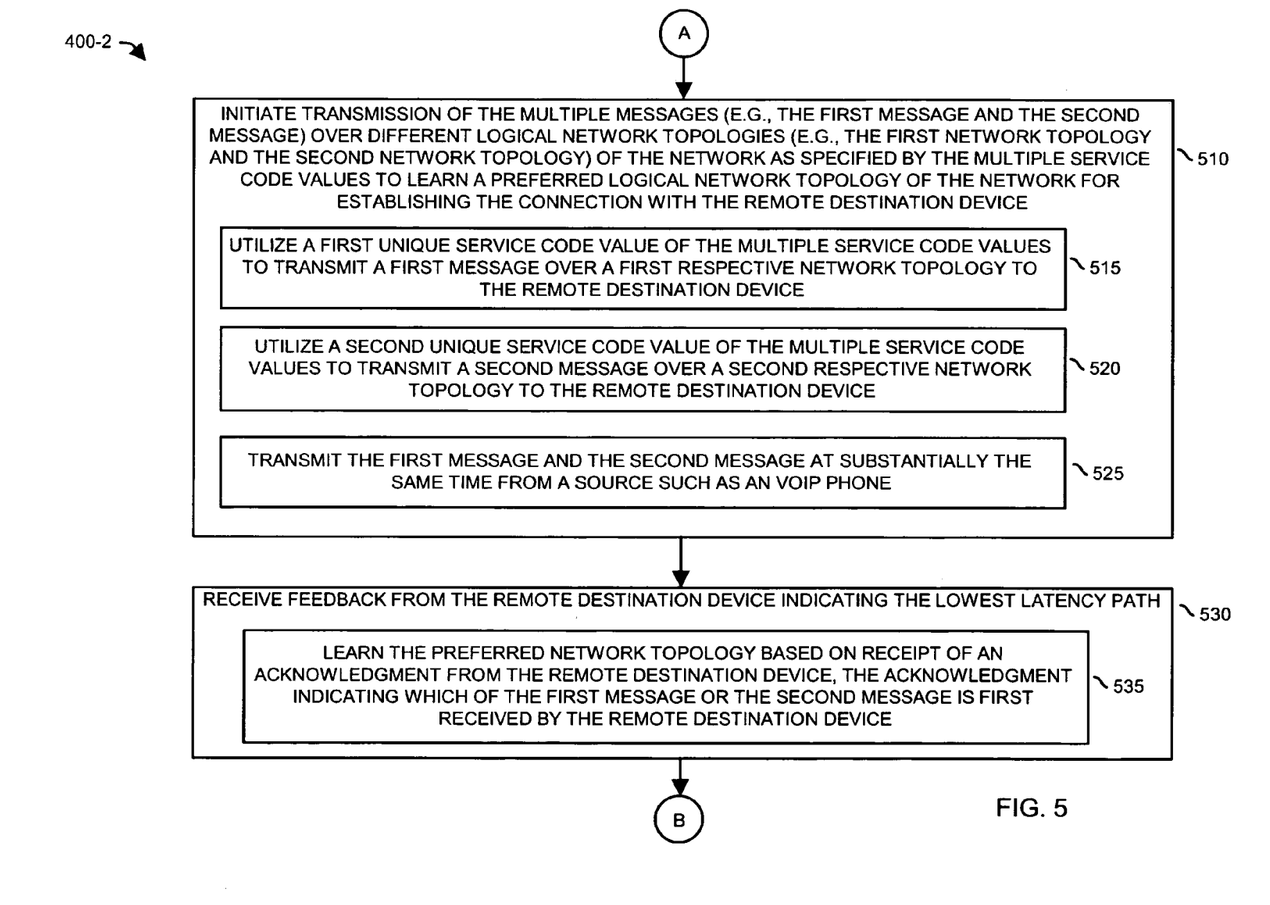
Figure 6:
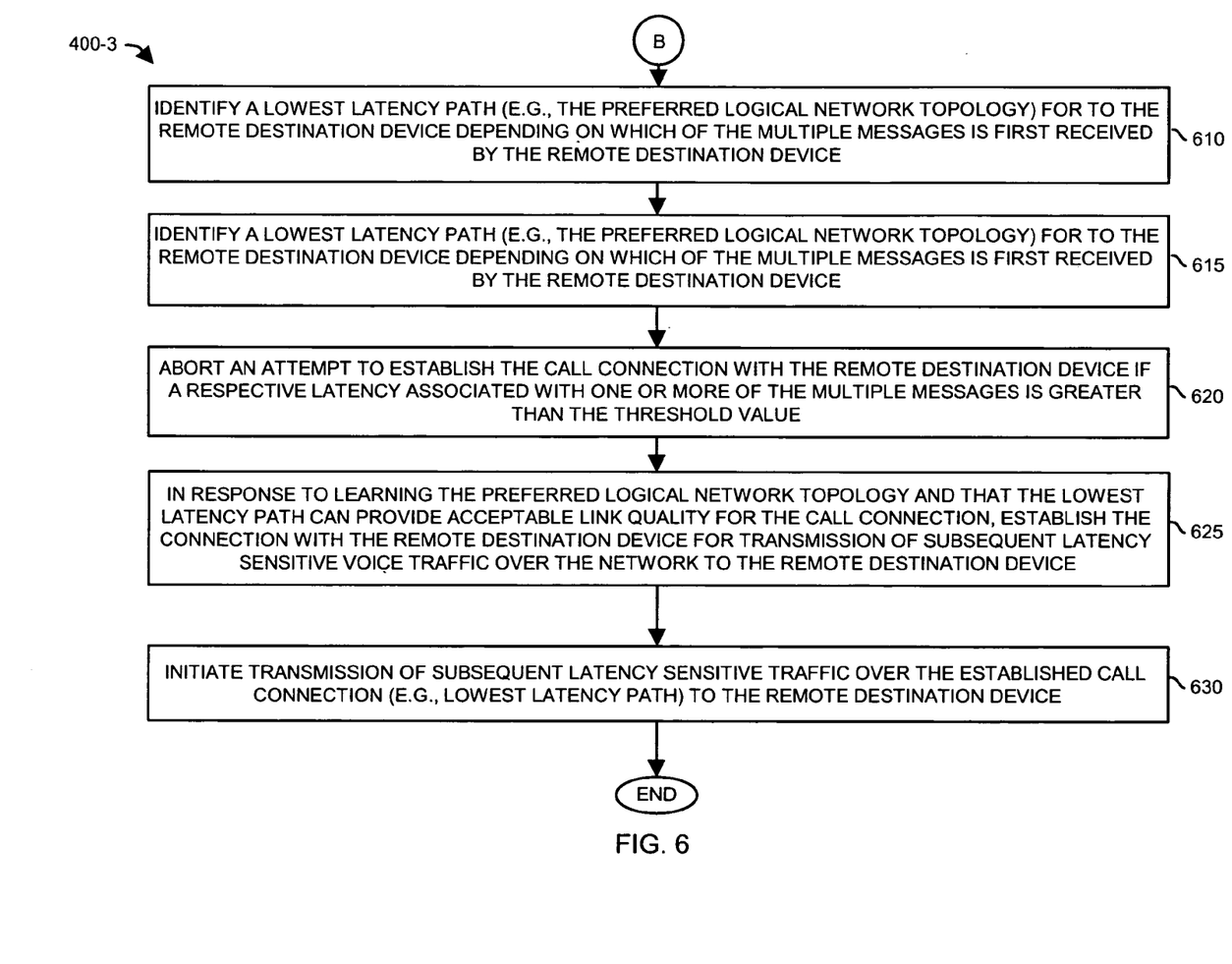

FIGS. 4, 5, and 6 combine to form a flowchart 400 (e.g., flowchart 400-1, flowchart 400-2, and flowchart 300-2) illustrating example processing steps associated with communication environment 100 according to an embodiment herein. Note that techniques discussed in flowchart 400 may overlap with some of the techniques discussed above.

In step 410, the link manager 140 receives a request 105 (e.g., input from a VOIP phone user) to establish a connection (e.g., a VOIP call connection) with a remote destination device 170 over a network 190.

In step 415, in response to receiving the request 105, the link manager 140 obtains multiple code service values by communicating with service code manager/distributor 195. Service code manager/distributor 195 can be a call manager that converts a received phone numbers into corresponding network addresses of target devices, a first hop network element in a path from the source device 120 to the remote destination device 170, any network element network 190, etc. As previously discussed, the service code manager/distributor 195 provides the multiple service code values, each of which specifies a different logical network topology on which to transmit messages 161 (e.g., data packets) over network 190.

In one embodiment, in addition to obtaining the service code values, the source device 120 can communicate with a call management function. The call management function can be configured to include the service code manager/distributor 195 that provides the service code values to the source device 120. In such an embodiment, the source device 120 provides the call manager a phone number associated with the remote destination device 170. In addition to providing the service code values to the source device 120, the call management function notifies the source device 120 of the network address associated with the remote destination device 170. As will be discussed below, the source device 120 then utilizes the network address as well as the multiple service code values to communicate multiple messages over the different logical network topologies to the remote destination device 170.

In step 420, the link manager 140 of source device 120 encodes each of multiple messages 161 to include a unique service code value of the multiple service code values obtained from service code manager/distributor 195.

In sub-step 425, the link manager 140 encodes a first message 161-1 to include a network address of the remote destination device 170 as well as a first unique service code value (e.g., DSCP 50) for transmission over a network topology 191-1 of the network 190 to the remote destination device 170. In one embodiment, the network topology 191-1 is a label-switching network (e.g., an Multi-Protocol Label Switching network) supporting VOIP communications.

In step 430, the link manager 140 encodes a second message 161-2 to include the network address of the remote destination device 170 as well as a second unique service code value (e.g., DSCP 51) of the multiple service codes for transmission of the second message 161-2 over network topology 191-2 of the network 190 to the remote destination device 170. In one embodiment, the network topology 191-2 is an IPSEC-based virtual private network supporting VOIP communications. Accordingly, the paths (e.g., network topologies 191) tested for latency can rely on use of different protocols, routing resources, etc. to provide a path to remote destination device 170.

In step 510 in FIG. 5, the link manager 140 initiates transmission of the multiple messages 161 (e.g., one after the other or at the same time) over different logical network topologies 191 depending on the service code value encoded in the respective messages 161. This is part of a PING-like or PONG-like embodiment in which the source device 120 tests which of multiple different network topologies has a lowest latency for establishing a call connection with the remote destination device 170.

In sub-step 515, as discussed above, the link manager 140 utilizes a first unique service code value of the multiple service code values to transmit a first message over a first respective network topology 191 to the remote destination device 170.

In sub-step 520, the link manager 140 utilizes a second unique service code value of the multiple retrieved service code values to transmit a second message over a second respective network topology 191-2 to the remote destination device 170.

In sub-step 525, the link manager 140 transmits the first message 161-1 and the second message 161-2 at substantially the same time from the source device 120.

In step 530, the link manager 140 receives feedback from the remote destination device 170 indicating the lowest or lower latency path to from the source device 120 to the remote destination device 170.

As indicated in sub-step 535, the link manager 140 can learn a preferred network topology 191 based on receipt of one or more acknowledgment messages 162 from the remote destination device 170. The remote destination device 170 can set a flag in one of the transmitted acknowledgment messages 162 to indicate which of the first message 161-1 or the second message 161-2 is first received by the remote destination device 170. Since message 161-1 and message 161-2 are transmitted at substantially the same time from source device 120, the message 161 arriving at the remote destination device 170 indicates which is the lower latency path of multiple network topologies 191 tested in network 190. As discussed above, other methods such as time-stamping and clock synchronization can be used to measure latency of messages 161 and messages 162.

In step 610, the link manager 140 analyzes acknowledgment messages 162-1 and acknowledgment message 162-2 to identify a lowest latency path (e.g., the preferred logical network topology) to the remote destination device 170. This can include inspecting whether or not a flag is set in the acknowledgment messages 162. Recall that the remote destination device 170 can set a flag in one of multiple returned acknowledgment messages 162 that indicate which of messages 161 is first received the remote destination device 170.

Accordingly, embodiments herein can include receiving a first reply message (e.g., acknowledgment message 162-1) from the remote destination device 170 over a first network topology 191-1 and receiving a second reply message (e.g., acknowledgment message 162-2) from the remote destination device 170 over a second network topology 191-2 in response to transmitting the multiple messages 161 to the remote destination device 170. The source device 120 can be configured to notify the remote destination device 170 which of the first acknowledgment message 162-1 or the second acknowledgment message 162-2 is received first or has a lower latency path.

In step 615, the link manager 140 can compare parameters (e.g., latency values) associated with a lower latency path to a maintained threshold value.

In step 620, the link manager 140 can abort an attempt to establish the call connection with the remote destination device if a respective latency associated with one or more of the multiple messages is greater than the threshold value. Accordingly, steps 615 and 620 can be implemented to prevent the source device 120 from establishing a respective call connection if the lowest available path cannot provide a high enough quality of service for voice communications between the source device 120 and the remote destination device 170.

In step 625, in response to learning the preferred logical network topology (e.g., lowest latency path) which is capable of providing acceptable link quality for the call connection, the link manager 140 establishes the connection with the remote destination device 190 for transmission of subsequent latency sensitive voice traffic over the network 190 to the remote destination device 170.

In step 630, the link manager 140 initiates transmission of subsequent latency sensitive traffic (e.g., VOIP data traffic generated from a respective user speaking into a source device 120 configured as a IP phone) over the established call connection (e.g., lowest latency path or chosen network topology 191) to the remote destination device 170.

Figure 7:
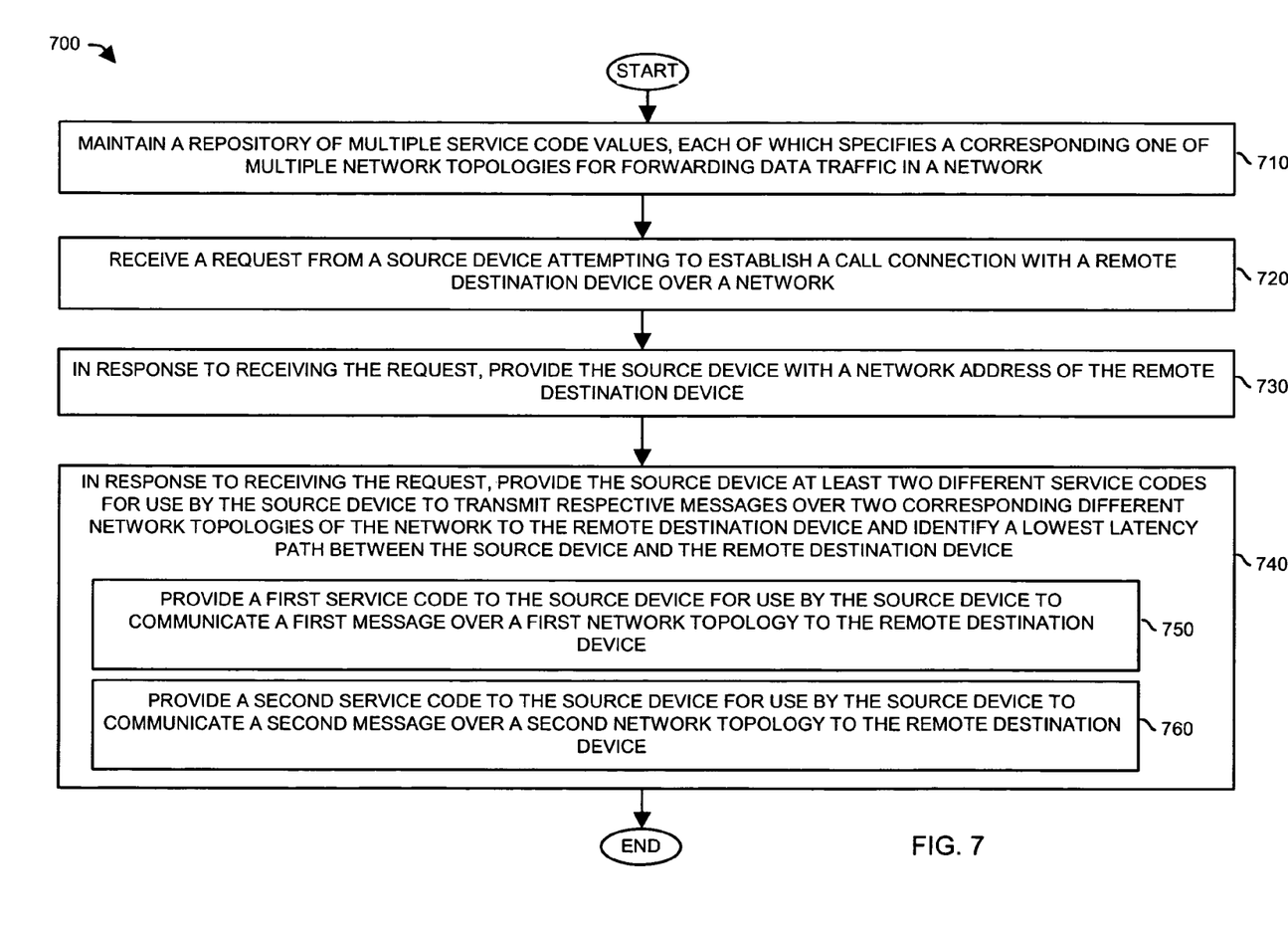
FIG. 7 is a flowchart illustrating an example method of distributing service codes according to embodiments herein.

FIG. 7 is a flowchart 700 illustrating an example technique of supporting communications according to embodiments herein. Note that techniques discussed in flowchart 700 may overlap and at least partially summarize some of the techniques discussed above.

In step 710, the service code manager/distributor 195 maintains a repository 180 of multiple service code values. Each of the service code values maintained by the service code manager/distributor 195 specifies a corresponding one of multiple network topologies for forwarding data traffic in a network. In other words, each service code value can be used to classify messages for transmission over a respective (one or more) network topology 191.

In step 720, the service code manager/distributor 195 receives a request from source device 120 attempting to establish a call connection with a remote destination device 170 over a network 190.

In step 730, in response to receiving the request, (if configured to do so) the service code manager/distributor 195 provides the source device 120 with a network address of the remote destination device 170.

In step 740, in response to receiving the request, the service code manager/distributor 195 provides the source device 120 at least two different service codes (e.g., DSCP values) for use by the source device 120 to transmit respective messages 161 over two or more corresponding different network topologies 191 of the network 190 to the remote destination device 170 and identify a lower latency path between the source device 120 and the remote destination device 170.

In sub-step 750, the service code manager/distributor 195 provides a first service code (e.g., DCSP50) to the source device 120 for use by the source device 120 to communicate a first message 161-1 over a first network topology 191-1 to the remote destination device 170.

In sub-step 760, the service code manager/distributor 195 provides a second service code (e.g., DSCP51) to the source device 120 for use by the source device 120 to communicate a second message 161-2 over a second network topology 191-2 to the remote destination device 170.

Figure 8:
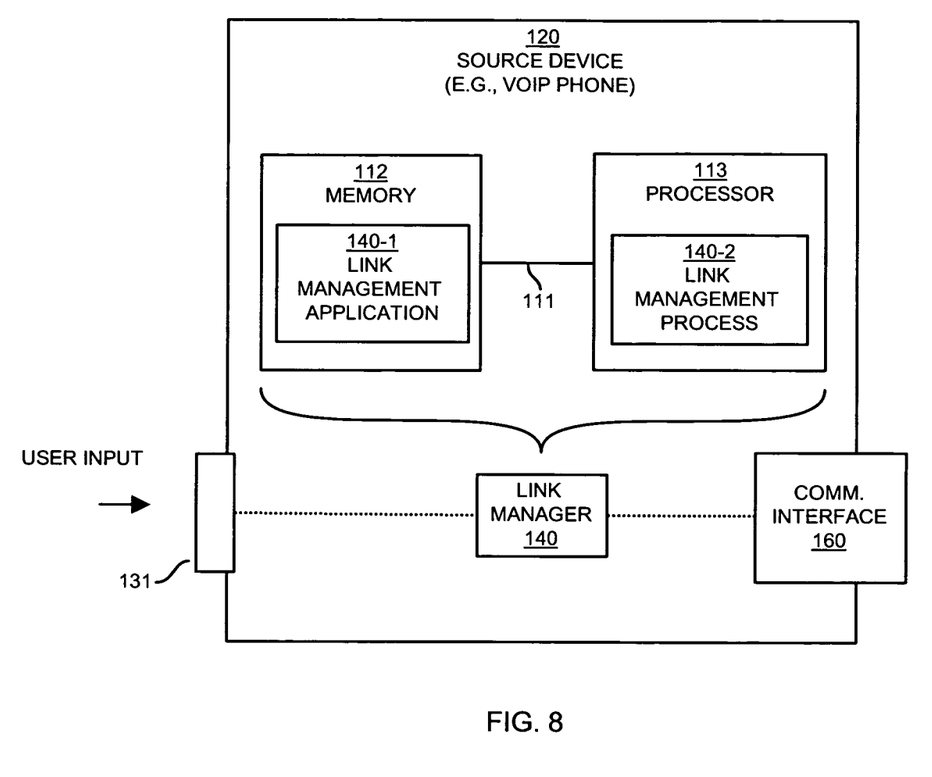
FIG. 8 is a diagram of an example platform for use in a communication environment according to embodiments herein.

FIG. 8 is a block diagram illustrating an example communication device (e.g., a source device 120 such as an IP phone) for executing a link manager 140 (e.g., link manager application 140-1 and link manager process 140-2) and/or other functions according to embodiments herein. The link manager application 140-1 can support any of the functionality as described herein.

Source device 120 can be a computerized device such as a VOIP phone and include a computer system or processing system such as a microprocessor, a digital signal processor, controller, personal computer, workstation, portable computing device, console, processing device, etc.

As shown, source device 120 of the present example includes an interconnect 111 that couples a memory system 112 and a processor 113. Communication interface 131 enables the source device 120 to receive input and provide output. Communication interface 160 enables source device 120 to communicate over network 190.

As shown, memory system 112 is encoded with link manager application 140-1 to perform the different functions as described herein. Functionality (such as link manager application 140-1) associated with the source device 120 can be can be embodied as software code such as data and/or logic instructions (e.g., code stored in the memory or on another computer readable medium such as a disk) that, when executed, support functionality according to different embodiments described herein.

During operation, processor 113 of source device 120 accesses memory system 112 via the interconnect 111 in order to launch, run, execute, interpret or otherwise perform the logic instructions of the link manager application 140-1. Execution of link manager application 140-1 produces processing functionality in link manager process 140-2. In other words, the link manager process 140-2 represents one or more portions of the link manager application 140-1 (or the entire application) performing within or upon the processor 113 in the source device 120.

It should be noted that, in addition to the link manager process 140-2, embodiments herein include the link manager application 140-1 itself (i.e., the un-executed or non-performing logic instructions and/or data). The link manager application 140-1 can be stored on a computer readable medium such as a floppy disk, hard disk, or optical medium. The link manager application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of link manager application 140-1 in processor 113 as the link manager process 140-2. Those skilled in the art will understand that the source device 120 can include other processes and/or software and hardware components, such as an operating system that controls allocation and use of hardware resources associated with the source device 120.

As discussed above, techniques herein are well suited for use in applications such as those that support communications in a network environment. However, it should be noted that configurations herein are not limited to such use and thus configurations herein and deviations thereof are well suited for use in other environments as well.

In summary, embodiments herein can include a handset (e.g., source device 120) handset (e.g., source device 120) that initially establishes a connection with its corresponding call management function. The source device 120 sends the phone number or extension of the remote destination device 170 to the call management function. The call management function compares this number with a respective dial-plan associated with the caller and replies back with the IP Address of the destination handset (e.g., remote destination device 170.

In one embodiment, the call management function replies back with the DSCP values that are used as possible MTR paths (e.g., network topologies 191) on this network 190. The call management function can learn the MTR paths by participating at least as a passive node in the IGP topology or through static configuration. The assignment of the DSCP values for the MTR path validation can be based on the priority of the sender (e.g., communication device such as source device 120) and receiver (e.g., remote destination device 170) of the phone call. For this reason the call management function can or should be included in a loop used for DSCP value setting.

The handset (e.g., link manager 140 in source device 120) runs a pre-connection test by sending a packet to the destination handset (e.g., remote destination device 170). A packet is sent for each DSCP value that the call management function communicates to the source device 120. In one embodiment, the data packets produced by the source device 120 are sent as quickly as possible (back to back) and the order randomized each time it is sent (once for each call).

The remote destination device 170 optionally loops the data packets back to the source device 120. This may take as little as a few microseconds or on the order of milliseconds to test which of multiple paths provides an acceptable latency.

The source device 120 initiates a call connection based on a DSCP value that returns to it first, others DSCPs used to transmit data packets to the remote destination device 170 are discarded. In other words, the source device 120 establishes a respective call connection with the remote destination device 170 using the DSCP associated with the lowest latency path.

Embodiments herein provide a number of novel and useful features over conventional applications. For example, embodiments herein enable selection of a lowest latency path available at a time of a respective call. Additionally, embodiments herein support dynamically adjust based on load/latency as a loaded link is likely to have fuller buffers that need to be drained and the PONG packet will take longer to get through the loaded network. Embodiments herein also can enable self-regulating in that as the lower latency path gets loaded it will intersect with the higher latency path and then load balancing will automatically occur across all available paths. Embodiments herein can ensure that an unavailable path at the time of call setup is not chosen, traditional convergence is depended on for calls in progress.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
   in response to receiving a request to establish a connection with a remote destination device over an Internet Protocol (IP) network, wherein receiving the request includes receiving input from a client device attempting to establish a VOIP (Voice Over IP) call connection with the remote destination device:
   obtaining multiple service code values, each of the service code values being a Differentiated Service Code Point (DSCP) value and each of the service code values specifying a different logical network topology of the IP network, wherein obtaining the multiple service code values includes communicating with a call manager that provides the multiple service code values, and wherein each of which service code values specifies the different logical network topology on which to transmit the multiple messages,
   encoding each of multiple messages to include a unique service code value of the multiple service code values,
   initiating transmission of the multiple messages over the different logical network topologies of the IP network as specified by the respective messages' unique service code values to learn a preferred logical network topology of the IP network for establishing the connection with the remote destination device, and
   aborting an attempt to establish the connection with the remote destination device if a respective latency associated with the multiple messages is greater than a threshold value.

2. The method as in claim 1 further comprising:
   identifying a lowest latency path to the remote destination device depending on which of the multiple messages is first received by the remote destination device.

3. The method as in claim 2 further comprising:
   receiving feedback from the remote destination device indicating the lowest latency path; and
   initiating transmission of subsequent latency sensitive traffic over the lowest latency path to the remote destination device.

4. The method as in claim 1 further comprising:
   in response to providing the call manager a phone number associated with the remote destination device, receiving a network address of the remote destination device from the call manager; and
   utilizing the network address and the multiple service code values to communicate the multiple messages over the different logical network topologies to the remote destination device.

5. The method as in claim 1 further comprising:
   in response to learning the preferred logical network topology, establishing the connection with the remote destination device for transmission of subsequent latency sensitive voice traffic over the IP network to the remote destination device.

6. The method as in claim 1, wherein initiating transmission of the multiple messages over the different logical network topologies includes:
   utilizing a first unique service code value of the multiple service code values to transmit a first message over a first respective network topology to the remote destination device; and
   utilizing a second unique service code value of the multiple service code values to transmit a second message over a second respective network topology to the remote destination device.

7. The method as in claim 6 further comprising:
   initiating transmission of the first message over the first respective network topology and transmission of the second message over the second respective network topology to the remote destination device at substantially the same time; and
   learning the preferred network topology based on receipt of an acknowledgment from the remote destination device, the acknowledgment indicating which of the first message or the second message is first received by the remote destination device.

8. The method as in claim 1, wherein initiating transmission of the multiple messages over the different logical network topologies includes:
utilizing a first unique service code value of the multiple service code values to classify a first data packet for transmission over a virtual private network to the remote destination device; and
utilizing a second unique service code value of the multiple service code values to classify a second data packet for transmission over a label switching network to the remote destination device.

9. The method as in claim 1,
wherein encoding each of multiple messages to include a unique service code value of the multiple service code values includes:
encoding a first message to include a network address of the remote destination device as well as a first unique service code value of the multiple service codes for transmission of the first message over a first network topology of the IP network to the remote destination device; and
encoding a second message to include the network address of the remote destination device as well as a second unique service code value of the multiple service codes for transmission of the second message over a second network topology of the IP network to the remote destination device;
wherein initiating transmission of the multiple messages over different logical network topologies of the IP network as specified by the multiple service code values includes:
initiating transmission of the first message over the first network topology and transmission of the second message over the second network topology to the remote destination device at substantially the same time; and
the method further comprising:
learning the preferred network topology based on receipt of an acknowledgment from the remote destination device, the acknowledgment indicating which of the first message or the second message is first received by the remote destination device; and
in response to learning the preferred logical network topology, establishing the connection with the remote destination device for transmission of subsequent latency sensitive voice traffic over the IP network to the remote destination device.

10. The method as in claim 1 further comprising:
in response to transmitting the multiple messages to the remote destination device, receiving a first reply message from the remote destination device over a first network topology and receiving a second reply message from the remote destination device over a second network topology; and
notifying the remote destination device which of the first reply message or the second reply message is received first.

11. A method comprising:
maintaining a repository of multiple service code values, each of the multiple service code values being a Differentiated Service Code Point (DSCP) value and each of the multiple service code values specifying a corresponding one of multiple network topologies for forwarding data traffic in an Internet Protocol (IP) network;
receiving a request from a source device attempting to establish a call connection with a remote destination device over the IP network, wherein receiving the request includes receiving input from a client device attempting to establish a VOIP (Voice Over IP) call connection with the remote destination device;
in response to receiving the request, providing the source device at least two different service codes for use by the source device to transmit respective messages over two corresponding different network topologies of the IP network to the remote destination device, wherein at least a first network topology comprises an multi-protocol label switching (MPLS) network and wherein a second network topology comprises a virtual private network; and
aborting an attempt to establish the connection with the remote destination device if a respective latency associated with the respective messages is greater than a threshold value.

12. The method as in claim 11 wherein providing the source device the at least two different service codes includes:
providing a first service code to the source device for use by the source device to communicate a first message over a first network topology to the remote destination device; and
providing a second service code to the source device for use by the source device to communicate a second message over a second network topology to the remote destination device.

13. The method as in claim 11, wherein providing the source device at least two different service codes enables the source device to transmit the respective messages and identify a lowest latency path between the source device and the remote destination device.

14. The method as in claim 11 further comprising:
in response to receiving the request, providing the source device with a network address of the remote destination device.

15. A communication device comprising:
a processor;
a memory unit that stores instructions associated with code executed by the processor; and
an interconnect coupling the processor and the memory unit, enabling the processor to execute the code and perform operations of:
in response to receiving a request to establish a connection with a remote destination device over an Internet Protocol (IP) network, wherein receiving the request includes receiving input from a client device attempting to establish a VOIP (Voice Over IP) call connection with the remote destination device:
obtaining multiple service code values, each of the service code values being a Differentiated Service Code Point (DSCP) value and each of the service code values specifying a different logical network topology of the IP network, wherein obtaining the multiple service code values includes communicating with a call manager that provides the multiple service code values, and wherein each of which service code values specifies the different logical network topology on which to transmit the multiple messages,
encoding each of multiple messages to include a unique service code value of the multiple service code values,
initiating transmission of the multiple messages over the different logical network topologies of the IP network as specified by the respective messages' unique service code values to learn a preferred logical network topology of the IP network for establishing the connection with the remote destination device, and aborting an attempt to establish the connection with the remote destination device if a respective latency associated with the multiple messages is greater than a threshold value.

16. The communication device as in claim 15 configured to further support operations of:

identifying a lowest latency path to the remote destination device depending on which of the multiple messages is first received by the remote destination device.

17. The communication device as in claim 16 configured to further support operations of:

receiving feedback from the remote destination device indicating the lowest latency path; and initiating transmission of subsequent latency sensitive traffic over the lowest latency path to the remote destination device.

18. The communication device as in claim 15 configured to further support operations of:

in response to providing the call manager a phone number associated with the remote destination device, receiving a network address of the remote destination device from the call manager; and utilizing the network address and the multiple service code values to communicate the multiple messages over the different logical network topologies to the remote destination device.

19. The communication device as in claim 15 configured to further support operations of:

in response to learning the preferred logical network topology, establishing the connection with the remote destination device for transmission of subsequent latency sensitive voice traffic over the IP network to the remote destination device.

20. The communication device as in claim 15, wherein initiating transmission of the multiple messages over the different logical network topologies includes:

utilizing a first unique service code value of the multiple service code values to transmit a first message over a first respective network topology to the remote destination device; and utilizing a second unique service code value of the multiple service code values to transmit a second message over a second respective network topology to the remote destination device.

21. The communication device as in claim 20 configured to further support operations of:

initiating transmission of the first message over the first respective network topology and transmission of the second message over the second respective network topology to the remote destination device at substantially the same time; and learning the preferred network topology based on receipt of an acknowledgment from the remote destination device, the acknowledgment indicating which of the first message or the second message is first received by the remote destination device.

22. The communication device as in claim 15, wherein initiating transmission of the multiple messages over the different logical network topologies includes:

utilizing a first unique service code value of the multiple service code values to classify a first data packet for transmission over a virtual private network to the remote destination device; and utilizing a second unique service code value of the multiple service code values to classify a second data packet for transmission over a label switching network to the remote destination device.

23. The communication device as in claim 15, wherein encoding each of multiple messages to include a unique service code value of the multiple service code values includes:

encoding a first message to include a network address of the remote destination device as well as a first unique service code value of the multiple service codes for transmission of the first message over a first network topology of the IP network to the remote destination device; and encoding a second message to include the network address of the remote destination device as well as a second unique service code value of the multiple service codes for transmission of the second message over a second network topology of the IP network to the remote destination device;

wherein initiating transmission of the multiple messages over different logical network topologies of the IP network as specified by the multiple service code values includes:

initiating transmission of the first message over the first network topology and transmission of the second message over the second network topology to the remote destination device at substantially the same time; and the communication device further supporting operations of:

learning the preferred network topology based on receipt of an acknowledgment from the remote destination device, the acknowledgment indicating which of the first message or the second message is first received by the remote destination device; and in response to learning the preferred logical network topology, establishing the connection with the remote destination device for transmission of subsequent latency sensitive voice traffic over the IP network to the remote destination device.

24. The communication device as in claim 15 configured to further support operations of:

in response to transmitting the multiple messages to the remote destination device, receiving a first reply message from the remote destination device over a first network topology and receiving a second reply message from the remote destination device over a second network topology; and notifying the remote destination device which of the first reply message or the second reply message is received first.

25. Software encoded in one or more non-transitory computer-readable media and, when executed, operable to:

obtain multiple service code values in response to receiving a request to establish a connection with a remote destination device over an Internet Protocol (IP) network, each of the service code values being a Differentiated Service Code Point (DSCP) value and each of the service code values specifying a different logical network topology of the IP network, wherein receiving the request includes receiving input from a client device attempting to establish a VOIP (Voice Over IP) call connection with the remote destination device, and wherein obtaining the multiple service code values includes communicating with a call manager that provides the multiple service code values, and wherein each of which service code values specifies the different logical network topology on which to transmit the multiple messages;

encode each of multiple messages to include a unique service code value of the multiple service code values;

initiate transmission of the multiple messages over the different logical network topologies of the IP network as specified by the multiple service code values to learn a preferred logical network topology of the IP network for establishing the connection with the remote destination device; and aborting an attempt to establish the connection with the remote destination device if a respective latency associated with the multiple messages is greater than a threshold value.

* * * * *

UNITED STATES PATENT AND TRADEMARK OFFICE
CERTIFICATE OF CORRECTION

PATENT NO. : 8,705,381 B2
APPLICATION NO. : 11/810400
DATED : April 22, 2014
INVENTOR(S) : Gourlay et al.

Page 1 of 1

It is certified that error appears in the above-identified patent and that said Letters Patent is hereby corrected as shown below:

Title Page, Assignee (73):

Please insert --San Jose, CA (US)-- after Cisco Technology, Inc.

Signed and Sealed this
Twentieth Day of January, 2015

Michelle K. Lee
*Deputy Director of the United States Patent and Trademark Office*